May 4, 1943.　　　　　　　S. BRIEF　　　　　　2,318,460
MARACAS
Filed March 16, 1942
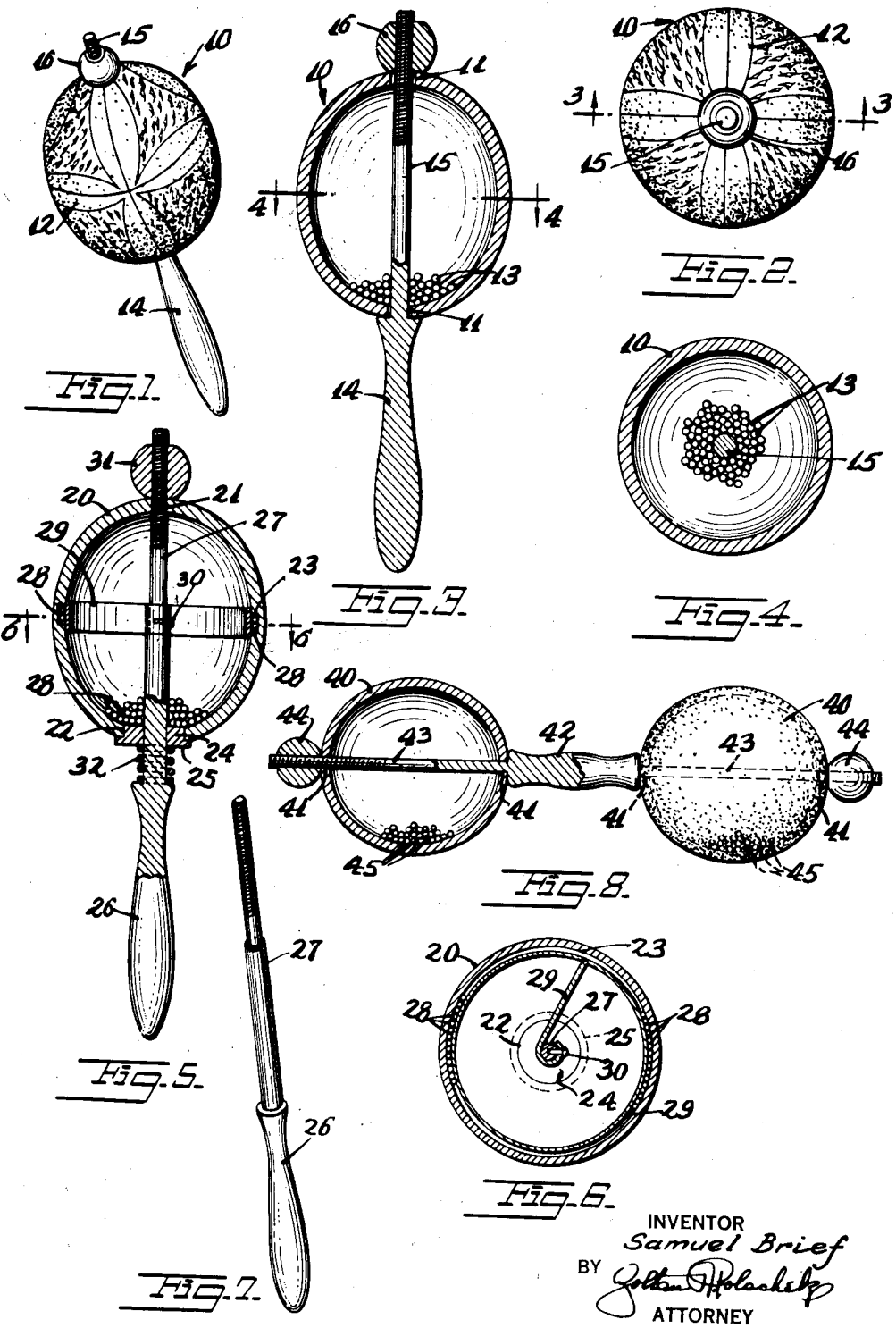
INVENTOR
Samuel Brief
BY
ATTORNEY Patented May 4, 1943

2,318,460

UNITED STATES PATENT OFFICE 2,318,460

MARACA

Samuel Brief, New York, N. Y.

Application March 16, 1942, Serial No. 434,833

2 Claims. (Cl. 46—193)

This invention relates to new and useful improvements in a maraca.

More specifically, the invention proposes the construction of a maraca characterized by a gourd enclosing shot or other like elements and which is removably mounted upon a handle in a manner to permit it to be removed from the handle to interchange or replenish the supply of shot.

A further object of the invention proposes to characterize the handle by an integrally formed reduced shank portion which is arranged to be extended diametrically through the gourd to threadedly receive a cap which engages against the gourd in a manner to securely lock the gourd in position upon the reduced shank portion.

Another object of the invention proposes the provision of a means within the gourd which permits a portion of the shot to be trapped in an inoperative position so as to change the tone value of the maraca.

It is a further object of this invention to construct a maraca characterized by a handle having a pair of maraca members mounted upon opposite ends thereof in a manner to provide a dual maraca which may be used in instances where two maracas are now used.

For further comprehension of this invention, and of the objects and advantages thereof, reference will be had to the following description and accompanying drawing, and to the appended claims in which the various novel features of the invention are more particularly set forth.

In the accompanying drawing forming a material part of this disclosure—

Fig. 1 is a perspective view of a maraca constructed in accordance with this invention.

Fig. 2 is a plan view of Fig. 1.

Fig. 3 is a vertical sectional view taken on the line 3—3 of Fig. 2.

Fig. 4 is a horizontal sectional view taken on the line 4—4 of Fig. 3.

Fig. 5 is a vertical sectional view similar to Fig. 3, but illustrating a maraca constructed in accordance with a modification of this invention.

Fig. 6 is a horizontal sectional view taken on the line 6—6 of Fig. 5.

Fig. 7 is a perspective view of the handle per se.

Fig. 8 is an elevational view partly in section of a maraca constructed in accordance with a modification of this invention.

The maraca, according to this invention, includes a one-piece substantially spherical gourd 10 which is hollowed out and dried. During the hollowing out process the gourd is formed with a pair of oppositely disposed openings 11. After being thoroughly dried the exterior surface of the gourd 10 is provided with an appropriate decorative design 12. The design 12 may be imparted to the gourd by burning, carving, sketching, painting, or by any other method which is capable of permanently marking the surface of the gourd.

The interior of the gourd is provided with a quantity of shot 13, or other like elements.

A handle 14 projects from one side of the gourd 10 and has a reduced shank portion 15 which is extended through the aligned openings 11. The handle 14 and reduced shank portion 15 are integrally formed of wood or aluminum.

A cap 16 is threadedly engaged upon the free end of the shank portion 15 and bears against the gourd 10 for securely locking the gourd in position upon the shank portion 15 between the cap 16 and the handle 14. While the cap is shown illustrated in the form of a ball having a central threaded opening, it might be equally well constructed in the shape of a square, octagon or any other decorative shape.

The opposite end portions of the gourd 10 which are engaged by the handle 14 and the ball-like cap 16 may be considered the poles of the gourd for the purpose of better understanding this invention and the claims. All longitudinal elements on the surface of the gourd 10 are continuous from one pole to the other with the entire length of these elements being free to vibrate under the influence of the shot 13 when the maraca is shaken. However, this vibration will progressively increase in amplitude from the poles to the center of these elements producing a sound of fine quality.

The maraca according to this modification of the invention, is assembled in the following manner:

After being dried, hollowed and formed with the openings 11, the gourd is turned to have the opening at the sides permitting a quantity of shot 13 to be passed into the interior. The reduced portion 15 of a handle 14 is then passed through the openings 11 and the cap 16 is screwed upon the free end of the reduced portion 15. This securely locks the gourd 10 in position upon the reduced portion 15 and prevents the loss of the shot 13.

It is possible to remove the gourd 10 from the reduced shank portion 15 by first removing the cap 16 and it is then possible to replenish or interchange the supply of shot 13 to change the tone valve of the maraca.

In the form of the invention disclosed in Figs. 5 to 7, the maraca is characterized by a gourd 20 which is dried and hollowed out. During the hollowing out process the gourd 20 is formed with a front small opening 21, a larger rear opening 22 and an intermediate internal groove 23. The external face of the gourd is formed with a decorative design not shown on the drawing.

A bushing 24 is inserted into the larger rear opening 22 and is provided with an external flange 25 which surrounds the opening 22 and maintains the bushing from falling into the hollow of the gourd.

A handle 26 projects from one side of the gourd 20 and has a reduced shank portion 27 which is extended through the bushing 24 and the small front opening 21. A quantity of shot 28 or other similar material is disposed within the gourd 20 and the groove 23.

The shank portion 27, within the gourd 20 is provided with a leaf spring 29. One end of the leaf spring 29 is pinned to the shank portion 27 by means of a pin 30. The free end of the leaf spring 29 follows the contour of the inside face of the gourd 20 and engages over the groove 23 to hold the shot 28 captive within the groove 23.

A cap 31 is threadedly engaged upon the free end of the shank portion 27 and is arranged to bear against the front end of the gourd 20 adjacent the small front opening 21. An expansion spring 32 is coaxially wound upon the shank portion 27 and operates between the adjacent faces of the bushing 24 and the handle 26 for urging the shank portion 27 rearwards. This movement of the shank portion 27 causes the cap 31 to bear against the gourd 20 and positions the leaf spring 29 over the open side of the groove 23. The handle 26 may be pushed forwards compressing the spring 32, lifting the cap 31 out of its engaged position with the gourd and moving the spring 29 away from the groove 23 freeing the captured shot 28 to fall from the groove 23.

To return some of the shot 28 to the groove 23 it is necessary to turn the maraca on its side and push the shank 27 forwards against the holding action of the spring 32. This will move the leaf spring 29 of the groove 23 and permit some of the shot to enter the groove. When the shank portion is again released, the spring 32 will again pull the shank portion 27 rearwards engaging the leaf spring 29 over the groove 23 and prevent the shot 28 from falling out of the groove when the maraca is turned to a vertical position.

If it is desired to replenish or interchange the supply of shot 28 it is merely necessary to pull the bushing 24 rearwards on the shank portion 27 against the holding action of the spring 32. This movement disengages the bushing from the large rear opening, and permits shot to be passed through this opening, into or out of the gourd 20.

The maraca is assembled in the following manner:

The spring 32 and bushing 24 are passed onto the reduced shank portion 27. The end of the leaf spring 29 is then securely attached to an intermediate portion of the shank portion 27 by means of the pin 30. The free end of the shank portion 27 is then passed through the enlarged rear opening 22 and the leaf spring 29 is wound upon the shank portion 27 and passed through the opening 22. The leaf spring 29 upon reaching the interior of the gourd 20 will expand and assume the position shown in Fig. 5. The free end of the shank portion is then passed through the small front opening 21 and bushing 24 is engaged into the large rear opening 22. To complete the assembling of the maraca, the cap 31 is engaged upon the end of the reduced shank portion 27.

In the form of the invention disclosed in Fig. 8 a pair of gourds 40 are dried and hollowed, and during the hollowing out process the gourds are formed with oppositely disposed openings 41.

A handle 42 is disposed between the gourds 40, and is formed with a pair of outwardly extending shank portions 43. These shank portions 43 are projected through the openings 41 in the gourds 40. The free ends of the shank portions 43 threadedly carry caps 44. These caps 44 bear against the gourds 40 and lock them against the ends of the handle 42. The interior of each of the gourds 40 is provided with a quantity of shot 45 or other similar material.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A maraca, comprising a dried and hollowed out gourd or the like member having an internal groove and also having a pair of aligned openings in its ends, one of which is larger than the other and located at the rear of said member, a bushing having an external flange and removably set into said large opening, a handle extending from one side of said member and having a reduced shank portion extending through said bushing and through said small opening, shot or the like elements in said member and in said groove, a leaf spring mounted on said shank and extending over said groove and holding said shot in said groove, a cap threadedly engaged on the free end of said shank portion and engaging against said member, and resilient means urging said shank rearwards.

2. A maraca, comprising a dried and hollowed out gourd or the like member having an internal groove and also having a pair of aligned openings in its ends, one of which is larger than the other and located at the rear of said member, a bushing having an external flange and removably set into said large opening, a handle extending from one side of said member and having a reduced shank portion extending through said bushing and through said small opening, shot or the like elements in said member and in said groove, a leaf spring mounted on said shank and extending over said groove and holding said shot in said groove, a cap threadedly engaged on the free end of said shank portion and engaging against said member, and resilient means urging said shank rearwards, comprising an expansion spring coaxially mounted upon said shank portion and operating between the adjacent faces of said bushing and said handle.

SAMUEL BRIEF.